US007848771B2

(12) United States Patent
Boyle

(10) Patent No.: US 7,848,771 B2
(45) Date of Patent: Dec. 7, 2010

(54) WIRELESS TERMINALS

(75) Inventor: Kevin R. Boyle, Horsham (GB)

(73) Assignee: NXP B.V., Eindhoven (NL)

( * ) Notice: Subject to any disclaimer, the term of this patent is extended or adjusted under 35 U.S.C. 154(b) by 903 days.

(21) Appl. No.: 10/556,242

(22) PCT Filed: May 6, 2004

(86) PCT No.: PCT/IB2004/001533

§ 371 (c)(1),
(2), (4) Date: Nov. 10, 2005

(87) PCT Pub. No.: WO2004/102744

PCT Pub. Date: Nov. 25, 2004

(65) Prior Publication Data

US 2007/0040751 A1 Feb. 22, 2007

(30) Foreign Application Priority Data

May 14, 2003 (GB) ................................ 0311077.2
Feb. 20, 2004 (GB) ................................ 0403765.1

(51) Int. Cl.
*H04M 1/00* (2006.01)

(52) U.S. Cl. ................ 455/550.1; 455/562.1; 455/107; 455/121; 455/193.1; 343/702

(58) Field of Classification Search ............. 455/550.1, 455/280, 277.2, 277.1, 553.1, 90, 562.1, 455/552.1, 575.7, 575.5, 456.1, 107, 121, 455/193.1; 343/770, 768, 702, 700
See application file for complete search history.

(56) References Cited

U.S. PATENT DOCUMENTS

H000288 H * 6/1987 Gutleber ..................... 342/367
4,723,305 A * 2/1988 Phillips et al. ........... 455/575.7
5,142,255 A * 8/1992 Chang et al. ................ 333/204
6,342,869 B1 * 1/2002 Edvardsson et al. ......... 343/841
6,348,897 B1 * 2/2002 Alameh et al. .............. 343/702
6,424,300 B1 * 7/2002 Sanford et al. .............. 343/702
6,535,166 B1 * 3/2003 Ali ...................... 343/700 MS
6,799,050 B1 * 9/2004 Krasner ................... 455/456.1
6,980,782 B1 * 12/2005 Braun et al. ............. 455/277.2
7,161,273 B2 * 1/2007 Akiba et al. ................ 310/309
7,194,284 B2 * 3/2007 Rousu ..................... 455/553.1
2003/0078037 A1 * 4/2003 Auckland et al. ........... 455/422
2003/0098812 A1 * 5/2003 Ying et al. .................. 343/702
2003/0103010 A1 6/2003 Boyle
2003/0114188 A1 * 6/2003 Rousu ........................ 455/553
2003/0117331 A1 * 6/2003 Schamberger et al. ...... 343/770
2004/0087341 A1 * 5/2004 Edvardsson ............. 455/562.1

(Continued)

FOREIGN PATENT DOCUMENTS

EP 1128467 8/2001

(Continued)

*Primary Examiner*—Tan Trinh

(57) ABSTRACT

A wireless terminal includes a housing (10) containing a substrate (12) having a ground plane, RF components mounted on the substrate, a PIFA (Planar Inverted-F Antenna) (16) carried by the substrate and coupled electrically to the RF components for transmitting and receiving signals and a notch antenna (14) in the substrate for receiving signals in a frequency band at least partially overlapping the transmission bandwidth of some of the signals transmitted by the PIFA. The notch antenna is de-activated when the PIFA (16) is being used for transmitting a signal lying within the said transmission bandwidth.

20 Claims, 4 Drawing Sheets

U.S. PATENT DOCUMENTS

2004/0106428 A1 * 6/2004 Shoji ........................ 455/550.1
2004/0137950 A1 * 7/2004 Bolin et al. .............. 455/562.1
2004/0137971 A1 * 7/2004 Shoji ........................ 455/575.5
2004/0198293 A1 * 10/2004 Sadler et al. ................ 455/280
2004/0227599 A1 * 11/2004 Shen et al. .................... 335/78
2006/0256018 A1 * 11/2006 Soler Castany et al. ..... 343/700 MS

FOREIGN PATENT DOCUMENTS

WO WO0171846 9/2001

* cited by examiner f (800.0Mhz to 3.000Ghz)

f (800.0Mhz to 3.000Ghz)

WIRELESS TERMINALS

TECHNICAL FIELD

The present invention relates to improvements in or relating to wireless terminals. The invention has particular, but not exclusive, application to multiple standard cellular telephones operable in accordance telephone standards such as GSM (880 to 960 MHz), DCS (1710 to 1880 MHz) and PCS (1850 to 1990 MHz) and optionally Bluetooth® (ISM band in the region of 2.4 GHz). The present invention also relates to a wireless module having an antenna and at least those components included in the coupling stages.

BACKGROUND ART

In the course of developing successive generations of cellular telephones a great deal of effort has been spent on reducing the volume of the wireless terminal. Coupled with this reduction in the overall volume has been the desire to reduce the volume of the antenna whilst still maintaining its sensitivity. Externally mounted monopole antennas have been succeeded by internal antennas such as PIFAs (Planar Inverted-F Antennas) and notch antennas.

United States Patent Application Publication US 2003/0103010 A1 discloses a handset having a dual band antenna arrangement including a PIFA. PIFAs are popular with some manufacturers of handsets because they exhibit low SAR (Specific Absorption Rate) performance (and thereby less loss to the head) and they are installed above the phone circuitry and, therefore, "re-use" the space within the phone to some degree. The PIFA disclosed in this cited specification comprises a planar patch conductor mounted adjacent to, but spaced from, a ground conductor, usually a printed circuit board having at least the RF components mounted thereon. A first feed conductor is connected to the patch conductor at a first point, a second feed conductor is connected to the patch conductor at a second point, and a ground conductor is connected to the patch conductor at a third point located between the first and second points. The impedance to which the antenna is matched can be changed by altering the relative thicknesses of the first, second and ground conductors. The PIFA is fed by a diplexer to which for example GSM and DCS circuitry is connected. In a variant the planar patch antenna has a slot which can be considered as dividing the planar conductor into two differently sized antennas connected to a common feed. The smaller of the two antennas is coupled to receive DCS frequencies and the larger of the two antennas is coupled to receive GSM frequencies. However, such antennas are physically large and are difficult to use over more than two cellular bands.

U.S. Pat. No. 6,424,300 B1 discloses notch antennas for use in portable wireless terminals. The notch antenna is preferably formed in the ground plane conductor of a printed circuit board (PCB) that has RF circuitry thereon for receiving and transmitting RF signals. In this specification the notch antenna may be used as a primary antenna for radiating and receiving wireless communication signals or as a secondary antenna for receiving signals such as Bluetooth® or Global Positioning Signals (GPS). When the notch antenna is used as a secondary antenna, the primary antenna may comprise another notch antenna, an external monopole whip antenna or a PIFA. When the primary and secondary antennas are both notch antennas they preferably have orthogonal polarization directions which provides good isolation between them. Essentially this specification discloses a portable wireless terminal having two antennas, at least one of the two antennas being a notch antenna, for use in processing signals operating in accordance with a respective one of two standards. No arrangements are disclosed for use over more than two frequency bands

DISCLOSURE OF INVENTION

An object of the present invention is to reduce the antenna volume or increase the number of bands covered by a wireless terminal.

According to one aspect of the present invention there is provided a wireless terminal including a substrate having a ground plane, RF components mounted on the substrate and a PIFA (Planar Inverted-F Antenna) having connections electrically coupled to the ground plane, and the RF components characterised in that a notch antenna is provided in the substrate for receiving signals and in that de-activating means are provided for de-activating the notch antenna when the PIFA is being used for transmitting signals.

According to a second aspect of the present invention there is provided a wireless module comprising a substrate having RF components mounted thereon and means for connection to a PIFA (Planar Inverted-F Antenna), characterised in that a notch antenna is provided in the substrate and in that de-activating means are provided for de-activating the notch antenna.

The present invention is based on the realisation that the low SAR performance favours the use of a PIFA predominantly for transmission and a co-located notch can be used for reception (or in those applications when SAR is not considered to be important). A benefit of such an arrangement is that the antenna fractional bandwidth can be reduced if coverage of all the transmit and receive bands is divided between two or more antennas.

BRIEF DESCRIPTION OF DRAWINGS

The present invention will now be described, by way of example, with reference to the accompanying drawings, wherein.

In the drawings the same reference numerals have been used to indicate corresponding features.

MODES FOR CARRYING OUT THE INVENTION

Figure 1:
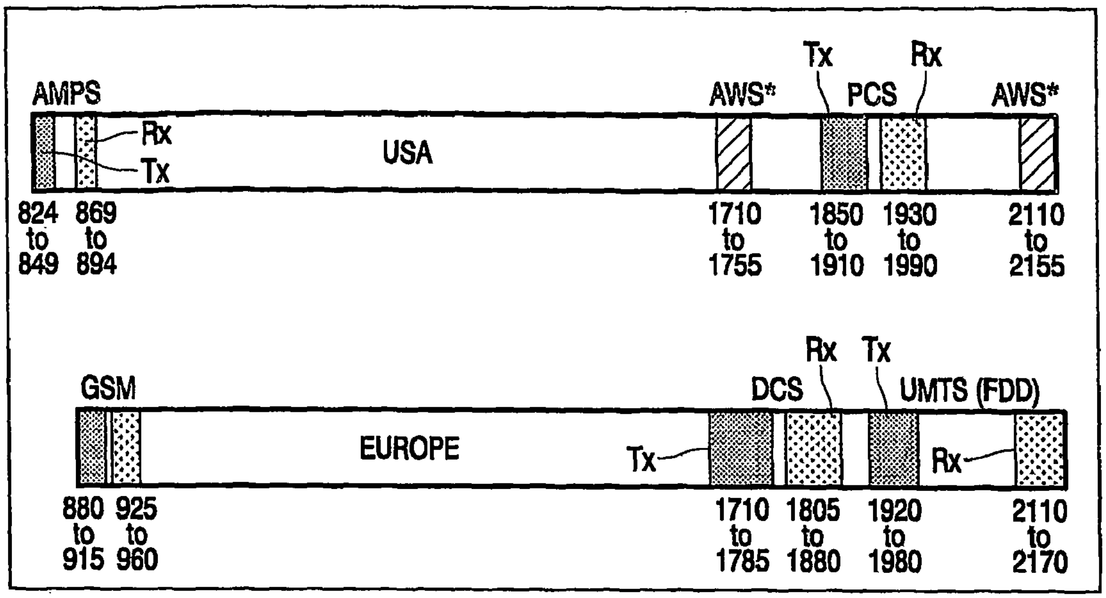
FIG. 1 are illustrations of how the cellular telephone bands are allocated in the USA and in Europe.

FIG. 1 shows the European and North American cellular bands. The transmit bands Tx are shown in dark grey (to the left of each pair), while the receive bands Rx are shown in light grey (to the right). In Europe both the GSM and DCS bands, 880 to 960 MHz and 1710 to 1880 MHz, respectively, accommodate time division duplex systems, while the UMTS bands, 1920 to 1980 MHz (transmit) and 2110 to 2170 MHz (receive), are predominantly frequency division, full duplex. In the USA, a mix of systems and duplex methods are used in the AMPS and PCS bands, 824 to 894 MHz and 1850 to 1990 MHz, respectively. The advanced wireless systems (AWS) bands, 1710 to 1755 MHz and 2110 to 2155 MHz, have recently been allocated for 3G systems, though it has yet to be resolved how the bands will be used.

Currently many phones are being made to support the European GSM and DCS bands together with the US PCS bands (in the TDMA IS54/136 mode). Since many other countries have adopted either the European or US band allocations, this allows near-worldwide roaming. To cover these bands an antenna fractional bandwidth of 15.1% is required (1710-1990 HMz). To cover the transmit bands only, a fractional bandwidth of only 11% is required, that is, the required bandwidth is reduced by approximately one third. To take advantage of this, the wireless terminal in accordance with the present invention uses a PIFA or PIFAs for the transmit bands and a notch or notches for the receive bands, for example the PCS Rx band. When the PIFA is used, the notch can be de-activated by switching across its open end. Since PIFAs and notches can occupy the same volume, and both antennas are required to cover only a sub-section of the total bandwidth, the total volume occupied can be reduced compared to other known solutions.

Figure 2:
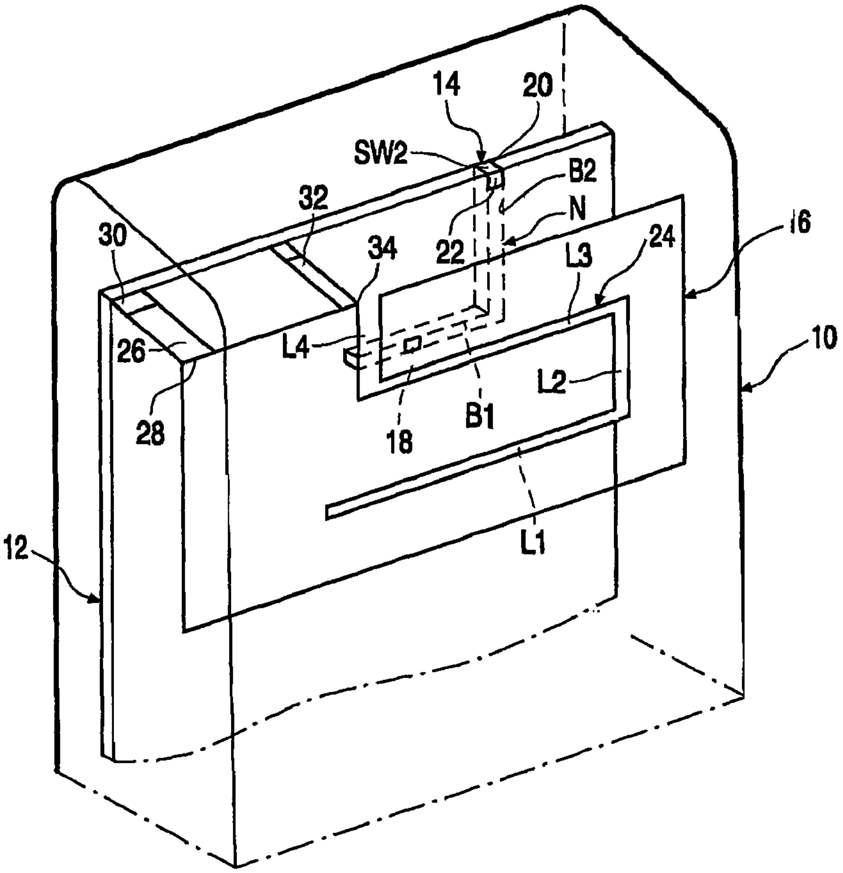
FIG. 2 is a perspective diagrammatic view of a portable wireless terminal comprising co-located PIFA and notch antenna.

FIG. 2 is a perspective diagrammatic view of a portable wireless terminal comprising a housing 10 containing a substrate in the form of a printed circuit board (pcb) 12, typically measuring 40×100×1 mm, carrying modules and other components constituting the RF, AF and control circuits of the wireless terminal. The pcb 12 also forms a ground plane of an antenna assembly consisting of a notch antenna 14 implemented in the pcb 12 and a dual-band GSM/DCS PIFA 16 mounted above the notch antenna 14 and lying in a plane parallel to, and spaced from, the pcb 12.

The notch antenna 14 comprises a L-shaped notch N in the pcb12. The notch N comprises a first, blind ended, branch B1 extending transversely of the pcb 14. An open end of the first branch B1 communicates with one end of a second branch B2, the other end of which branch B2 opens into the edge of the pcb 12. The notch N is fed at a selected point 18 near the blind end of the first branch B1 and a tuning/switching signal is applied to a selected point 20 adjacent to the open end of the second branch B2. The notch antenna 14 may be tuned by placing a tuning capacitor 22 at the selected point 20. With a small tuning capacitor, the notch antenna 14 can be used for Bluetooth®, or any other frequency in the ISM band in the region of 2.4 GHz (this varies from country to country), without adversely affecting the performance of the dual-band PIFA 16. With a larger tuning capacitor, the notch antenna 14 can be used for the PCS receive band (from 1930-1990 MHz).

The PIFA 16 comprises a planar conductor having a meanderline slot 24 formed by a plurality of interconnected rectilinear sections L1, L2, L3 and L4. The section L1 is closed at one end and the section L4 opens into the upper edge of the planar conductor as viewed in FIG. 2. The slot 24 can be considered as dividing the patch conductor into two antennas connected to a common feed, namely a smaller central radiator for the DCS/PCS frequency bands and a longer radiator, wrapped around the central radiator, for the GSM band. A feed connection 26 connects a corner 28 of the patch conductor to a connection point 30 at a corresponding corner of the pcb 12 and a ground connection 32 connects the ground plane on the pcb 12 to a point 34 on the patch conductor located at the same side of the opening of the slot 24 as the corner 28.

In operation the notch antenna 14 may be tuned to the PCS receive band using the larger capacitor. As this frequency is close to the upper frequency at which the PIFA 16 operates, it is necessary to short circuit the notch at the open end when the PIFA is in use. This can be achieved via a simple switch SW2 (for example a PIN diode, FET or MEMs (Micro Electromagnetic Systems) device) placed at the selected point 20.

Figure 3:
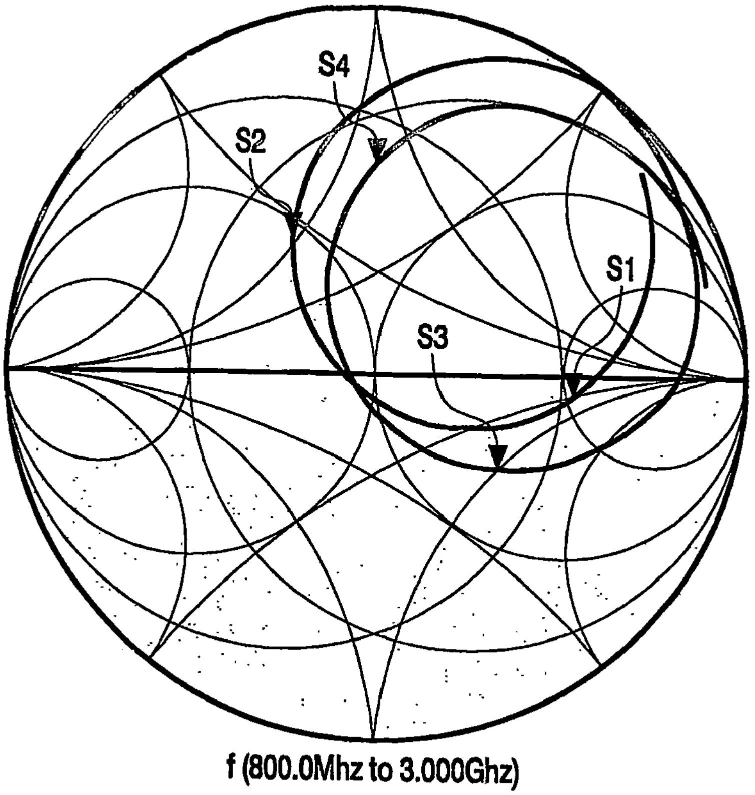
FIG. 3 is a Smith chart relating to the PIFA $S_{11}$.

When the switch SW2 is on, that is conductive, the $S_{11}$ performance of the dual-band PIFA 16 on a 40×100×1 mm pcb 12 is as shown in the Smith chart illustrated in FIG. 3. The Smith chart shows the simulated results for the frequencies f between 800 MHz and 3.0 GHz, the source impedance being 50Ω. The markers s1 and s2 show the GSM band edges while markers s3 and s4 show the DCS band edges. It can be seen that the notch antenna 14 has no effect on the input impedance of the PIFA. The notch antenna 14 it is believed will not adversely affect the SAR.

In the simulation described above the total efficiency of the antenna (including mismatch) is greater than 60% over the GSM and DCS/PCS bands, despite the fact that the switch is assumed to have an on-resistance of just 10Ω. Hence it is demonstrated that, in the on-condition, the switch quality is not an important factor.

Figure 4:
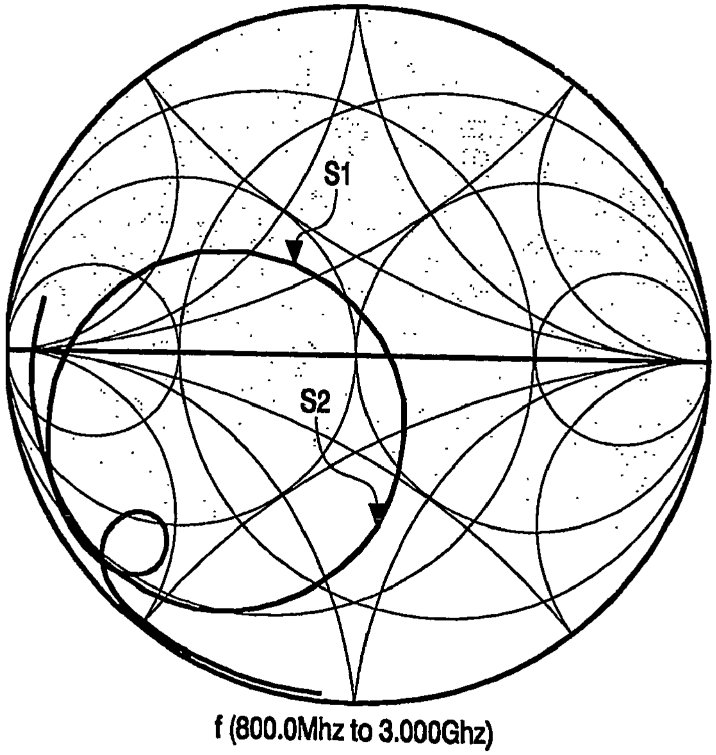
FIG. 4 is a Smith chart relating to the notch antenna $S_{11}$.

With the switch SW2 off, that is non-conductive, and an optimal tuning capacitance 22 for PCS receive is applied at the open end off the notch N, the $S_{11}$ performance of the notch antenna 14 for the frequencies f between 800 MHZ and 3.0 GHz is as shown in FIG. 4. In FIG. 4, the markers s1 and s2 show the PCS Rx band edges. In making this simulation the off-state is assumed to be provided by a PIN diode with a reverse bias capacitance of 0.2 pF and a Q of 20. Under such conditions a worst-case efficiency (including mismatch) of 50% is achieved. It is believed that a better performance could be achieved with the use of better quality switches, such as MEMs devices.

Figure 5:
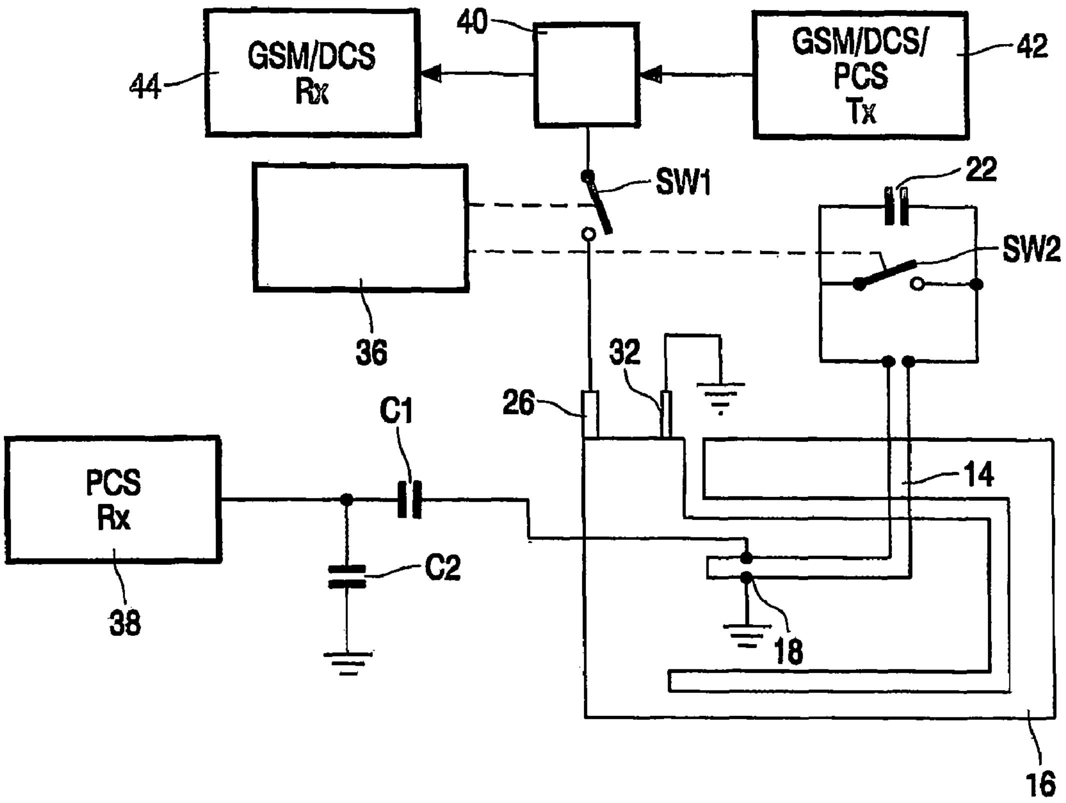
FIG. 5 is a combined schematic circuit diagram for operating the antenna arrangement shown in FIG. 2.

FIG. 5 schematically represents the above described circuit model for the PIFA 16 and the notch antenna 14.

In the GSM (transmit/receive mode) and the DCS transmit mode a switch SW1, which is operated in synchronism with the switch SW2, is connected to the PIFA feed point 26. A tuning capacitor 22 shunted by the switch SW2 is connected to the notch antenna 14. The operation of the switch SW2 is controlled by a controller 36. The feed point 18 is coupled by way of a capacitor C1 to an input of a PCS receiver 38. A further capacitor C2 couples the input to ground.

The feed connection 26 of the PIFA 16 is coupled by way of a series switch SW1 to a diplexer 40. The switch SW1 is controlled by the controller 36. A GSM/DCS/PCS transmitter 42 is coupled to an input of the diplexer 40 and an output of the diplexer is coupled to a GSM/DCS receiver 44.

In a transmit/receive mode the controller 36 operates the switches SW1 and SW2 in synchronism so that both are either on or off.

In the GSM/DCS/PCS transmit modes the switches SW1 and SW2 are in their on-condition. The transmitter 42 is coupled by way of the switch SW1 to the feed point 26 of the PIFA 16. The switch SW2 in its on-condition shunts the tuning capacitor 22 thereby detuning the notch antenna 14.

When the switches SW1 and SW2 are in their off-condition then no transmit signals are supplied to the feed point 26 and the tuning capacitor 22 is coupled to the notch antenna 14 to enable it to receive PCS signals. The received signals are conducted to the PCS receiver by way of the capacitor C1.

Figure 6:
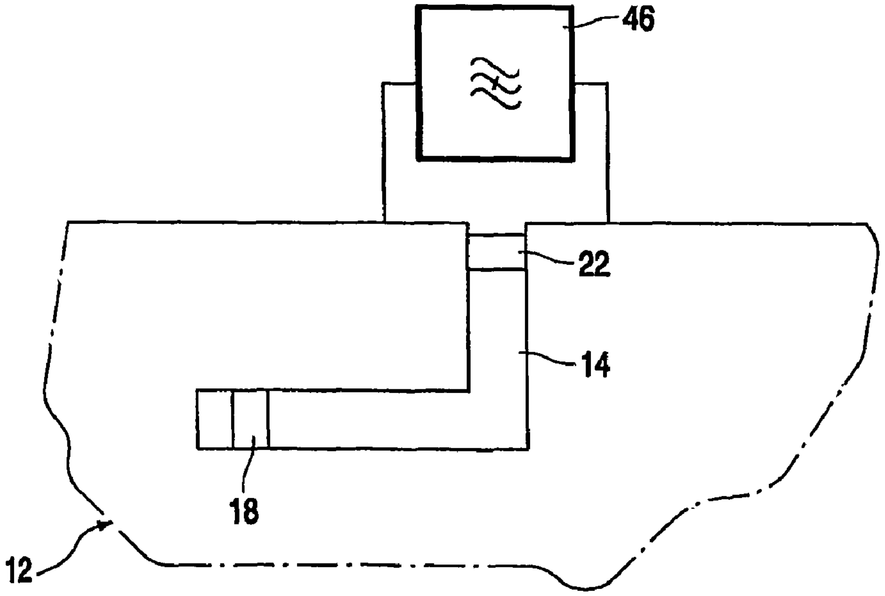
FIG. 6 illustrates the notch antenna being terminated by a passive network.

FIG. 6 illustrates the use of a passive network 46 to prevent the notch antenna 14 transmitting signals. The passive network 46 has a bandstop filter characteristic which appears as an open circuit at the frequency of the notch antenna and a short circuit at the frequency of the PIFA. For example, the PIFA 16 may be used for UMTS Tx while the notch antenna 14 is used for UMTS Rx. Since both Tx and Rx are simultaneously required for UMTS, the notch antenna 14 can be made to look inactive at the UMTS transmit frequency by the tuning capacitor and the filter, that is, the passive network 46, being effectively short circuited and active at the UMTS receive frequency by the tuning capacitor and the filter being effective as a result of the network 46 appearing as an open circuit. The passive network may be implemented as a bulk acoustic wave (BAW) resonator.

More than one notch antenna may be used, for example, for the simultaneous provision of GSM/DCS/PCS and Bluetooth® or for the provision of diversity.

Figure 7:
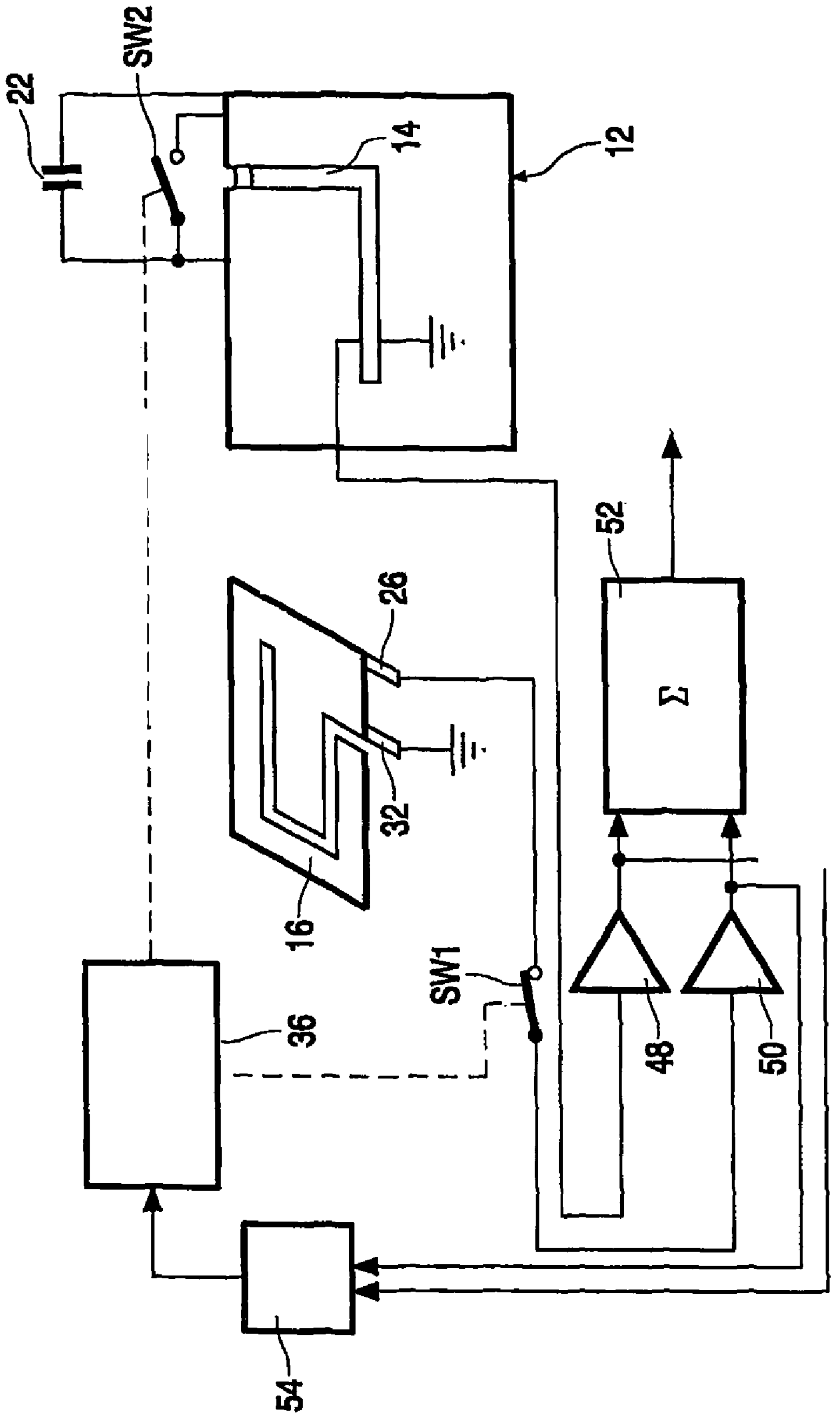
FIG. 7 is a block schematic diagram of the PIFA and the notch antenna being operated in a diversity mode.

FIG. 7 illustrates a simplified circuit arrangement for using the PIFA and notch antenna for switched diversity in which one or other of these antennas is selected based on signal quality/strength measurements and for simultaneous diversity in which the signals received by both antennas are combined. The outputs of both antennas are connected to inputs of respective amplifiers 48, 50. Outputs of these amplifiers are connected to a summing stage 52 which combines the outputs of the amplifiers.

Outputs of the amplifiers 48, 50 are also connected to a signal quality/strength measuring stage 54 which has an output coupled to the controller 36.

In the case of switched diversity the controller 36 controls the switches SW1, SW2 in the manner as described with reference to FIG. 5, that is either both are in their on-condition or in their off-condition so that any one time only one or other of the PIFA or notch antenna is in use. In operation, with say the PIFA selected, a quality/strength measurement is made by the measuring stage 54. The controller 36 changes the conditions of the switches so that a measurement is made using the notch antenna 14. The results are compared and the better antenna is selected by the controller 36

In the simultaneous case, the controller controls the switches SW1, SW2 so that SW1 is in the on-condition and SW2 is in the off-condition, as shown. Signals from both the antennas are summed in the summing stage 52.

The present invention may be applied to any multi-band system where low SAR is only required for some of the bands. This is particularly appropriate for all current and future wireless communication systems.

Although the present invention has been described with reference to a wireless terminal having a PIFA antenna and operating in the GSM, DCS and PCS bands. The invention may be applied to any multiband radio and in other dual band applications.

In the present specification and claims the word "a" or "an" preceding an element does not exclude the presence of a plurality of such elements. Further, the word "comprising" does not exclude the presence of other elements or steps than those listed.

From reading the present disclosure, other modifications will be apparent to persons skilled in the art. Such modifications may involve other features which are already known in the design, manufacture and use of wireless terminals and component parts therefor and which may be used instead of or in addition to features already described herein.

INDUSTRIAL APPLICABILITY

Antennas, wireless modules and wireless terminals such as multiple standard cellular telephones.

The invention claimed is:

1. A wireless terminal including a substrate having a ground plane thereon,

RF components mounted on the substrate, a PIFA (Planar Inverted-F Antenna) having connections electrically coupled to the ground plane, and the RF components characterised in that a notch antenna is provided in the substrate for receiving signals, and de-activating circuitry is provided for de-activating the notch antenna when the PIFA is being used for transmitting signals.

2. A wireless terminal as claimed in claim 1, characterised in that the PIFA is a dual band slotted planar patch antenna.

3. A wireless terminal as claimed in claim 1, characterised in that the notch antenna is a passive notch antenna and the de-activating circuitry is responsive to activation of the notch antenna to de-activate the PIFA.

4. A wireless terminal as claimed in claim 1, characterised in that the de-activating circuitry comprises a circuit for de-tuning the notch antenna.

5. A wireless terminal as claimed in claim 1, characterised in that capacitance means are connected across the notch for tuning the notch antenna and in that the circuitry for de-activating the notch antenna comprises means for shorting the capacitance means.

6. A wireless terminal as claimed in claim 1, characterised in that the de-activating circuitry comprises a passive network presenting an open circuit at an operating frequency of the notch antenna and a short circuit at an operating frequency of the PIFA.

7. A wireless terminal as claimed in claim 1, characterised in that the deactivating circuitry has a diversity operating mode in which both the PIFA and the notch antenna are active in a receive mode and in that means are provided for summing output signals from the PIFA and the notch antenna.

8. A wireless terminal as claimed in claim 1, characterised by means for measuring the contemporaneous quality of signals received by the PIFA and the notch antenna and for selecting for receiving signals from one of the PIFA and notch antenna that is receiving the better quality signals.

9. A wireless module comprising a substrate having RF components mounted thereon, circuitry for connection to a PIFA (Planar Inverted-F Antenna), a notch antenna in the substrate, and de-activating circuitry for de-activating the notch antenna.

10. A wireless module as claimed in claim 9, characterised in that the notch antenna is a passive notch antenna, capacitance means are connected across the notch for tuning the notch antenna and in that the circuitry for deactivating the notch antenna comprises means for shorting the capacitance means.

11. The wireless module of claim 9, wherein the de-activating circuitry couples the notch antenna when the wireless module is used for receiving signals, and de-activates the notch antenna when the PIFA is used for transmitting signals.

12. A wireless telephony device comprising:

telephony circuitry for processing and communicating telephony signals;

a ground plane;

a transmission antenna electrically coupled to the ground plane and adapted to transmit telephony signals from the telephony circuitry;

a notch antenna to receive wireless telephony signals for use by the telephony circuitry; and a de-activating circuit to selectively connect the notch antenna to for receiving signals and processing signals at the telephony circuitry, and for de-activating the notch antenna when the transmission antenna is used for transmitting signals.

13. The device of claim 12, wherein the transmission antenna is a PIFA (Planar Inverted-F Antenna), and wherein the notch antenna is a passive notch antenna.

14. The device of claim 12, wherein the de-activating circuit couples the notch antenna when the telephony circuitry is used for receiving signals, and de-activates the notch antenna when the transmission antenna is used for transmitting signals.

15. The device of claim 12, wherein the de-activating circuit de-activates the transmission antenna in response to activation of the notch antenna.

16. The device of claim 12, wherein the de-activating circuit de-activates the notch antenna by de-tuning the notch antenna.

17. The device of claim 12, further including a capacitance circuit connected across the notch antenna for tuning the notch antenna, and wherein the de-activating circuit shorts the capacitance circuit to selectively de-activate the notch antenna.

18. The device of claim 12, further including a capacitance circuit connected across the notch antenna for tuning the notch antenna, and wherein the de-activating circuit includes a passive network that presents an open circuit at the operating frequency of the notch antenna, a short circuit at the operating frequency of the transmission antenna, and shorts the capacitance circuit to selectively de-activate the notch antenna.

19. The device of claim 12, wherein the deactivating circuit has a diversity operating mode in which both the transmission and the notch antennas are active in a receive mode, further including a circuit to sum output signals from the transmission and notch antennas.

20. The device of claim 12, further including a circuit to measure the contemporaneous quality of signals received by the transmission and the notch antennas, and select, for receiving signals, one of the PIFA and notch antenna that is receiving a better quality signal.

* * * * *